Figure 1:
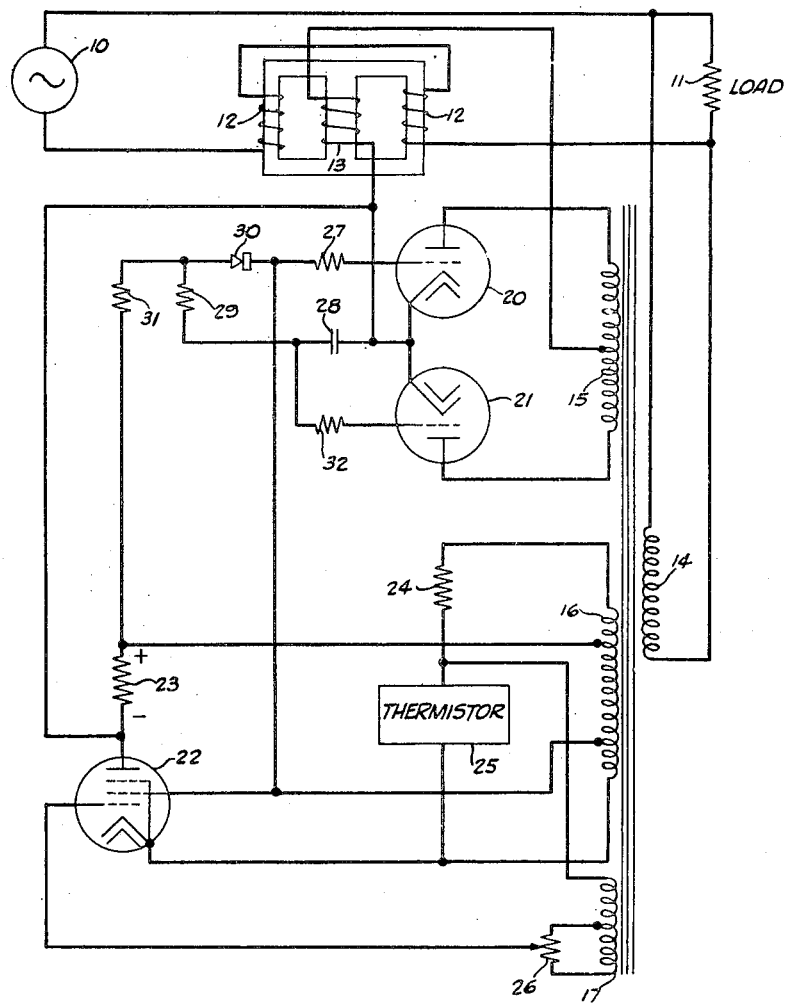

Oct. 25, 1949.    W. H. BIXBY    2,486,250
VOLTAGE REGULATOR
Filed Dec. 24, 1947    3 Sheets-Sheet 1

INVENTOR
W. H. BIXBY
BY
*G. J. Heuerman*
ATTORNEY

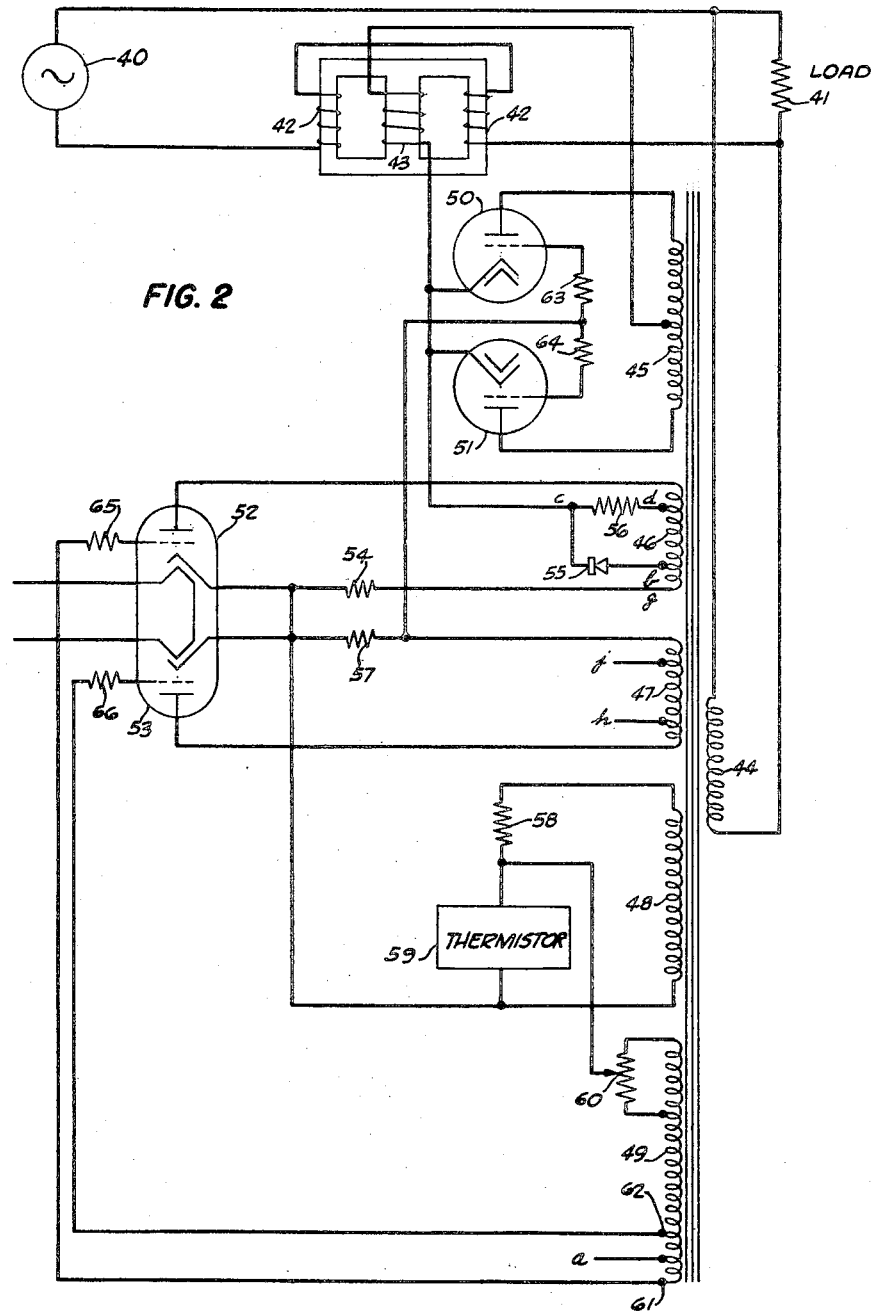

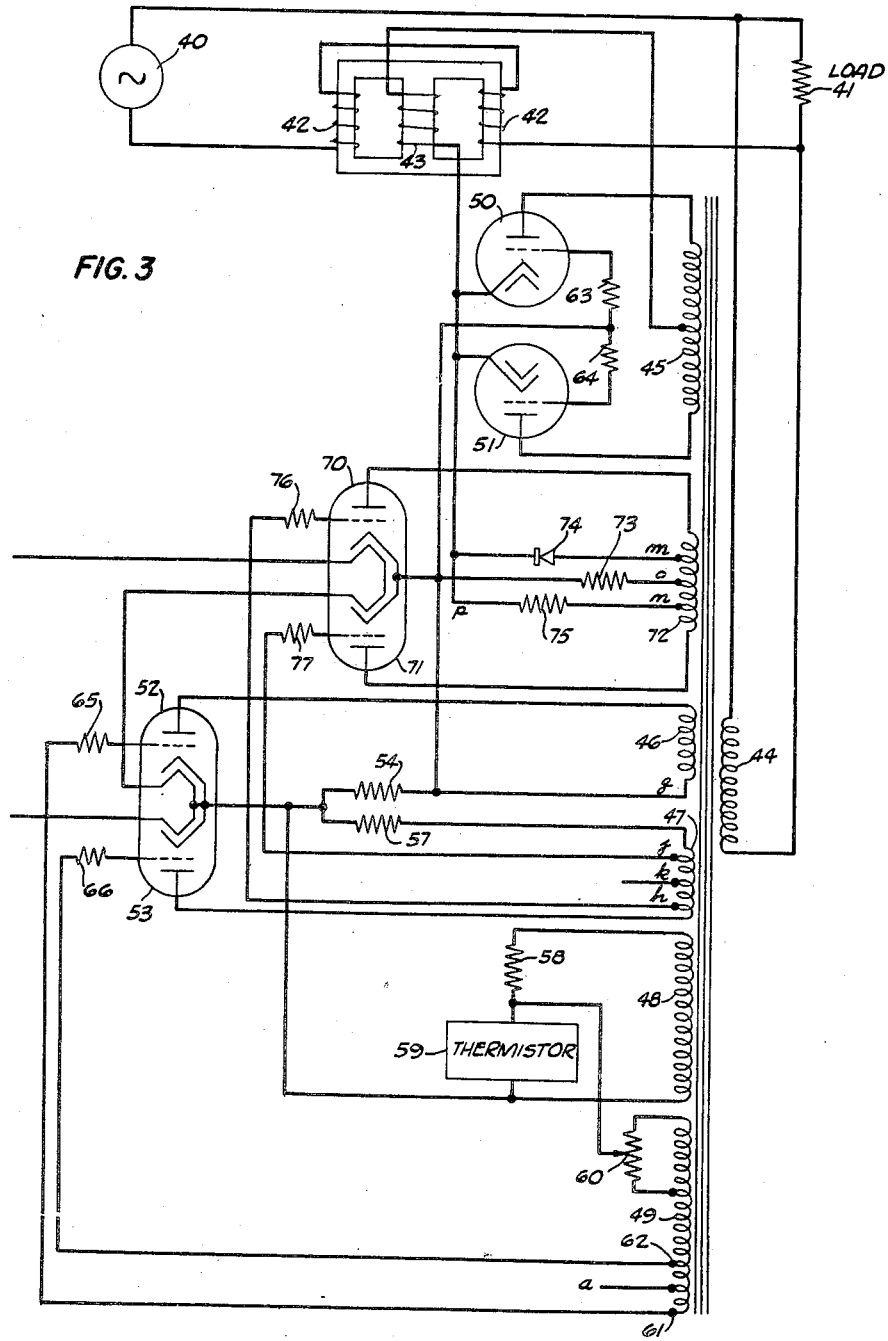

Patented Oct. 25, 1949

2,486,250

UNITED STATES PATENT OFFICE 2,486,250

VOLTAGE REGULATOR

William Herbert Bixby, Detroit, Mich., assignor to Donald R. Middleton and Stanley M. Hanley, doing business as Power Equipment Company, Detroit, Mich., a copartnership Application December 24, 1947, Serial No. 793,697

19 Claims. (Cl. 323—89)

This invention relates to voltage regulation and more particularly to apparatus for controlling a full wave space current rectifier to minimize voltage changes across a load.

An object of the invention is to provide improved apparatus for regulating the current supplied from an alternating current source to a load to minimize load voltage changes.

This invention is an improvement over the voltage regulating apparatus disclosed in my application Serial No. 575,463, filed January 31, 1945 (now Patent No. 2,435,572, granted February 10, 1948). The voltage regulator disclosed in said prior application employs a saturable reactor for controlling the current supplied from an alternating current source to a load under control of a unidirectional current supplied by a rectifier of alternating current from the source to a saturating winding of the reactor. A circuit comprising a thermistor or other resistance device the resistance of which changes in a consistent, non-linear manner with change of current through the device is employed for setting up a pulsating control voltage the percentage change of which is greater than the percentage change of load voltage. These control pulses are produced during half cycles of one polarity of the alternating voltage and are impressed upon the control circuit of one only of the rectifier tubes, the control grid and cathode of the second rectifier tube being directly conductively connected.

In an embodiment of the present invention herein shown and described for the purpose of illustration, the control voltage pulses which are produced during half cycles of the alternating current when the anode of one of the rectifier tubes is positive with respect to its cathode and which are impressed upon the control grid-cathode circuit of that tube to control the space current of the tube are also utilized to control the space current in the second rectifier tube of the full wave rectifier. The control grid and cathode of the second rectifier tube are connected by a current path comprising a condenser which is charged during the half cycle period of each control pulse to a potential difference substantially equal to the average voltage of the control pulse. During the succeeding half cycle when the anode of the second rectifier tube is positive with respect to its cathode, the condenser discharges at a relatively slow rate so that the voltage across the condenser will be fairly well maintained throughout the half cycle when the anode of the second rectifier tube is positive. As a result, the average voltage drops across the space current paths of the two rectifier tubes are maintained approximately equal during their respective conducting periods and the plate dissipation of the tubes remains approximately balanced under all conditions of operation. More important, the amplification of the rectifier is very nearly twice that of the rectifier of the prior application, thus permitting the control voltage change required for producing a given change of rectified current supplied to the saturable reactor to be reduced by about one-half. Moreover, the direct control of one of the rectifier tubes by the control pulses and the control of the second rectifier tube by the voltage across the condenser which is charged by the control pulses give the circuit a speed of response which could not be obtained if the condenser voltage were used to control both tubes of the rectifier.

In another embodiment of the invention, there is set up and impressed upon the control grid-cathode circuits of the rectifier tubes a unidirectional, pulsating voltage the successive pulses of which are produced during successive positive and negative half cycles of the alternating current source. This pulsating voltage is set up by a circuit comprising two space current devices upon the control electrode-cathode circuit of each of which is impressed the sum of two alternating voltages derived from the load voltage and opposed in phase. The amplitudes of the voltages change at different rates respectively, with respect to the load voltage. There are set up across resistors in the anode-cathode circuits of the two space current devices, during successive half cycle periods of the alternating current source, voltage pulses the amplitude of one of which increases, and the amplitude of the other of which decreases, in response to a load voltage increase and vice versa, these voltage pulses being combined in a circuit connecting the control electrodes and cathodes of the rectifier tubes with an unsymmetrical alternating voltage derived from the load voltage so that the voltage pulses are opposed to successive half cycles, respectively, of the unsymmetrical alternating voltage.

The invention will now be described with reference to the accompanying drawing in which:

Fig. 1 is a diagrammatic view of an alternating voltage regulator embodying the invention; and Figs. 2 and 3 are modifications of the alternating voltage regulator depicted in Fig. 1.

In the voltage regulator shown in Fig. 1 of the drawing, alternating current from a source 10 is supplied to a load 11 through the alternating current winding 12 of a saturable reactor which also has a saturating winding 13. There is provided a transformer having a primary winding 14 connected across the load 11 and a plurality of secondary windings 15, 16 and 17. A full wave rectifier comprising rectifier tubes 20 and 21, each having an anode, a cathode and a control electrode, is provided for rectifying current from source 10 and for supplying the rectified current to saturating winding 13 of the saturable reactor to control the impedance of winding 12 and thereby to control the load voltage. The end terminals of secondary winding 15 are connected to the anodes, respectively, of tubes 20 and 21, a mid-tap of winding 15 is connected to one terminal of reactor winding 13, and the cathodes of tubes 20 and 21 are connected to the other terminal of reactor winding 13.

For setting up a voltage for controlling the rectifier 20, 21 there is provided a circuit comprising a space current tube 22, resistor 23, resistor 24 and a thermistor 25. Alternating voltages are supplied from transformer winding 16 to resistor 23 and the anode-cathode path of tube 22 in series, to the screen grid-cathode path of tube 22 and to the current path comprising resistor 24 and thermistor 25 in series. The circuit connecting the control grid and cathode of tube 22 comprises secondary transformer winding 17, having a potentiometer 26 connected across a portion thereof, and thermistor 25 in series. In the operating range, the voltage across thermistor 25 is less than the voltage across transformer winding 17 and these voltages are opposed in phase in the control grid-cathode circuit of tube 22 so that the control grid of tube 22 is negative with respect to the cathode during half cycle periods when the anode of the tube is positive with respect to the cathode. Therefore, when the load voltage rises, for example, the control grid of tube 22 will become relatively more negative with respect to its cathode during the conducting half cycles of the tube so that the pulsating voltage across resistor 23 will be reduced in amplitude. As described in my prior application referred to above, there may be employed, instead of a thermistor the voltage across which decreases with increasing voltage across the load, a resistance means the voltage across which increases with increasing load voltage within the operating range, but at a lower rate than the rate of increase of load voltage, or one of the other arrangements described in the prior application may be employed for producing a control voltage for the rectifier 20, 21.

The control grid-cathode circuit of rectifier tube 20 comprises in series a resistor 27, a portion of transformer winding 16 and resistor 23, the amplitude of the pulse produced across resistor 23 being less than the peak amplitude of the alternating voltage across said portion of transformer winding 16. Thus, when the anode of tube 20 is positive, its control grid will be negative with respect to its cathode and, as the load voltage rises, for example, the control electrode of tube 20 will become relatively more negative with respect to the cathode so as to cause the current supplied through the space current path of tube 20 to reactor winding 13 to decrease.

The control voltage which is impressed upon the control grid-cathode circuit of tube 20 when its anode is positive with respect to its cathode is also used to control the current supplied through the space current path of tube 21 to the reactor winding 13 during the half cycle periods when the anode of tube 21 is positive with respect to its cathode. For this purpose there is provided a condenser 28 and a charging circuit therefor comprising a portion of transformer winding 16, resistor 23, condenser 28, a resistor 29 and an asymmetrically conducting element or varistor 30. The time constant of the condenser charging circuit is substantially equal to or somewhat less than the period of a half cycle of the alternating current from source 10. During half cycles when the anode of tube 21 is positive with respect to its cathode, condenser 28 discharges at a relatively slow rate through a discharge circuit comprising resistors 23, 31 and 29 in series the time constant of which circuit is made large with respect to the period of a half cycle of the alternating current from source 10. The positive terminal of charged condenser 28 is connected directly to the cathode of tube 21 and its negative terminal is connected through a resistor 32 to the control electrode of tube 21. Therefore, when the load voltage rises, for example, the control grids of tubes 20 and 21 will become more negative with respect to their cathodes to cause the full wave rectified current supplied to winding 13 of the reactor to be reduced. As a result the impedance of reactor winding 12 will increase, thereby minimizing the initially assumed increase of load voltage.

The alternating current voltage regulator shown in Fig. 2 comprises a saturable reactor having an alternating current winding 42 through which alternating current from source 40 is supplied to a load 41. There is provided a transformer having a primary winding 44 connected across the load 41 and a plurality of secondary windings 45, 46, 47, 48 and 49. A full wave rectifier comprising rectifier tubes 50 and 51, each having an anode, a cathode and a control electrode, is provided for rectifying current from source 40 and for supplying the rectified current to a saturating winding 43 of the saturable reactor, the current being supplied from secondary winding 45 through the space current paths of tubes 50 and 51 to the saturating reactor winding 43.

A circuit comprising space current devices 52 and 53, each having an anode, a cathode and a control electrode, is provided for setting up a voltage for controlling the rectifier 50, 51, the space current triodes 52 and 53 being parts of a twin triode tube, as shown, although separate single triode tubes may obviously be used if desired. Space current is supplied to triode 52 from transformer winding 46 through a resistor 54 one terminal of which is connected to the cathodes of triodes 52 and 53. There is connected across a portion of transformer winding 46 a current path bcd comprising in series an asymmetrically conducting element or varistor 55 and a resistor 56. Space current is supplied to triode 53 from secondary transformer winding 47 through a resistor 57 having one of its terminals connected to the cathodes of triodes 52 and 53. A current path comprising in series a resistor 58 and a thermistor 59 is connected across transformer winding 48. A potentiometer 60 is connected across a portion of secondary transformer winding 49. The grid-cathode circuit of triode 52 may be traced from the cathode, through thermistor 59 to the adjustable tap of potentiometer 60 and from terminal 61 of transformer winding 49 through resistor 65 to the grid. The grid-cathode circuit of triode 53 may be traced from the cathode, through thermistor 59, to the adjustable tap of potentiometer 60 and from terminal 62 of the transformer winding through resistor 66 to the grid. The transformer taps 61 and 62 are chosen to provide the proper operating biases for triodes 52 and 53 when the anodes of the respective triodes are positive with respect to the cathodes. The voltage measured from the tap of potentiometer 60 to the point $a$ which is electrically midway between the terminals 61 and 62 of transformer winding 49 is substantially equal to the voltage across thermistor 59 when the load voltage is at its normal value so that the voltage measured from the tap of potentiometer 60 to terminal 62 is less than the voltage across thermistor 59 and the voltage measured from the tap of potentiometer 60 to terminal 61 is greater than the voltage across thermistor 59. The grid of each triode will be negative with respect to its cathode when its anode is positive with respect to its cathode. The terminal of resistor 57 remote from the cathodes of triodes 52 and 53 is connected to the control grids of tubes 50 and 51 through resistors 63 and 64, respectively, and the common terminal $c$ of resistor 56 and asymmetrical varistor 55 is connected to the cathodes of tubes 50 and 51.

If the load voltage should rise, for example, the control grid of triode 52 will become more negative relative to its cathode when its anode is positive with respect to the cathode, thereby causing the space current in the triode and the amplitude of the voltage pulse produced across resistor 54 to be reduced. Under this condition, the control grid of triode 53 will become less negative when the anode is positive, each with respect to the cathode, so that the space current in triode 53 will increase to cause the amplitude of the voltage pulse across resistor 57 to increase. During half cycle periods when the anode of triode 52 is positive with respect to its cathode, the current flowing through resistor 56 and varistor 55 is negligibly small so that voltage $cg$ is substantially equal to the voltage $dg$. During half cycles when the anode of triode 53 is positive relative to its cathode, the resistance of varistor 55 is low so that the voltage $cg$ is substantially equal to the voltage $bg$. The voltage $cg$ is thus an unsymmetrical alternating voltage in series with the pulsating voltages across resistors 54 and 57 in the control grid-cathode circuits of tubes 50 and 51, the voltage $cg$ being opposed in phase with respect to, and of larger amplitude than, the voltage pulse produced across resistor 54 when the anode of triode 52 is positive with respect to its cathode and said voltage $cg$ being opposed in phase with respect to, and of smaller amplitude than, the voltage pulse produced across resistor 57 when the anode of triode 53 is positive with respect to its cathode. The resulting control grid-cathode voltage of each of tubes 50 and 51 is a pulsating voltage which makes the control grid of each tube negative with respect to its cathode, the successive pulses occurring coincidentally with the succeeding half cycles of the alternating voltage across the load 41. When the load voltage increases, for example, the voltage pulses across resistor 54 will decrease in amplitude to cause the negative voltage pulses impressed upon the grid-cathode circuit of tube 50, during half cycle periods when its anode is positive, to become larger in amplitude, thereby causing the current supplied to reactor winding 43 through the space current path of tube 50 to decrease. When the load voltage increases, the voltage pulses across resistor 57 will increase in amplitude to cause the negative voltage pulses impressed upon the grid-cathode circuit of tube 51, during half cycle periods when its anode is positive, to become larger in amplitude, thereby causing the current supplied to reactor winding 43 through the space current path of tube 51 to decrease. The impedance of winding 42 of the saturable reactor thus increases to cause the assumed rise of load voltage to the minimized.

The embodiment of the invention shown in Fig. 2 may be modified if desired by omitting the varistor 55 and resistor 56, the cathodes of tubes 50 and 51 being connected to the common terminal $g$ of resistor 54 tnd transformer winding 46 and the control grids of tubes 50 and 51 being connected through resistors 63 and 64 respectively to terminals such as $h$ and $j$, respectively, of transformer winding 47.

Where greater amplification is needed in the control amplifier circuit, the regulating circuit shown in Fig. 3 may be employed. This embodiment of the invention being in large part like the arrangement shown in Fig. 2, the elements of Fig. 3 which correspond to elements of Fig. 2 are given the same designation in order to avoid repetition.

In the embodiment of Fig. 3 there are provided two space current triodes 70 and 71 of a twin triode tube to which space currents are supplied from a secondary transformer winding 72. Space current is provided for triodes 70 and 71 during periods of half cycles of opposite polarity of the load voltage through a circuit comprising a resistor 73 one terminal of which is connected to a mid-terminal $o$ of the transformer winding and the other terminal of which is connected to the cathodes of triodes 70 and 71. A current path comprising in series an asymmetrical varistor 74 and resistor 75 is connected across a portion of transformer winding 72 at taps $m$ and $n$. The common terminal $p$ of varistor 74 and resistor 75 is connected to the cathodes of tubes 50 and 51. The common terminal $g$ of transformer winding 46 and resistor 54 is connected through resistors 63 and 64, respectively, to the control grids of tubes 50 and 51. When the anode of triode 70 is positive with respect to its cathode, varistor 74 is conducting and the potentials of points $p$ and $m$ are substantially the same. The current passed by varistor 74 is negligibly small when the anode of triode 71 is positive with respect to its cathode so that the points $p$ and $n$ are substantially at the same potential for this condition. By suitable choice of taps $m$ and $n$, tubes 50 and 51 are biased to cut-off by the voltage pulses from tap $o$ to point $p$ when no current is flowing through resistor 73. The control electrode-cathode circuit of triode 70 may be traced from the cathode, through resistors 54 and 57 to the upper terminal of transformer winding 47 and from tap $h$ of the transformer winding through resistor 76 to the control grid of triode 70. The control electrode cathode circuit of triode 71 may be traced from the cathode through resistors 54 and 57 to the upper terminal of winding 47 and from tap $j$ of the winding through resistor 77 to the control grid of triode 71. Point $k$ of transformer winding is a mid-potential point between taps $j$ and $h$ and, at normal load voltage, points $g$ and $k$ are at the same potential. Thus the control grids of triodes 70 and 71 are negative when the respective anodes are positive each with respect to the cathodes. The cathode heaters of triodes 52, 53, 70 and 71 are connected in series, as shown, so that failure of any of the heaters or removal of either of the twin triode tubes from its socket will result in reduction of current supplied by rectifier 50, 51 to reactor winding 43 and a resulting reduction of load voltage.

When the load voltage rises, for example, the control electrode of triode 52 will become more negative during the half cycle when its anode is positive with respect to the cathode, thus causing the amplitude of the voltage pulse produced across resistor 54 to decrease. As a result the control grid of triode 70 will become more negative to cause the amplitude of the voltage pulse across resistor 73 to decrease. The voltage pulse across resistor 73 is smaller than, and opposed in polarity to, the voltage between points $p$ and $o$. Therefore the amplitude decrease of the voltage pulse across resistor 73 causes the grid of tube 50 to become more negative with respect to the cathode and the current supplied to reactor winding 43 during this half cycle through the space current path of tube 50 is decreased. During the next half cycle when the anode of triode 53 is positive, its control grid will become less negative with respect to its cathode due to the assumed rise of load voltage, thereby causing the amplitude of the voltage pulse across resistor 57 to increase. The control electrode of triode 71 thus becomes more negative with respect to its cathode to cause the voltage pulse produced across resistor 73 to decrease. The voltage pulse impressed upon the grid-cathode circuit of tube 51 is thus increased in amplitude to make the grid more negative and to reduce the current supplied through the space current path of tube 51 to the reactor winding 43. As a result the impedance of reactor winding 42 is increased and the assumed rise of load voltage is minimized.

What is claimed is:

1. In combination, full wave rectifying apparatus comprising two space current devices for rectifying alternate half cycles, respectively, of current from an alternating current source and for supplying the rectified current to a direct current load, each of said devices having an anode, a cathode and a control electrode, a current path comprising a first and a second resistance means, one of said resistance means having a resistance-current characteristic such that its resistance increases in response to a change in a certain direction of the root-mean-square value of the current flowing in said current path, the other of said resistance means having a resistance-current characteristic, which differs from that of said one of said resistance means, means for impressing upon said current path an alternating voltage derived from said source, means comprising one of said resistance means for setting up a control voltage during periods of half cycles of one polarity only of said alternating current source, and means for utilizing said control voltage to control the potential of each of said control electrodes with respect to the potential of said cathodes.

2. A combination in accordance with claim 1 in which there are provided a condenser, a circuit comprising said condenser connecting the control electrode and cathode of one of said devices, a charging circuit for said condenser, and means for impressing said control voltage upon said charging circuit.

3. In combination, a full wave rectifier comprising a first and a second space current device, each having an anode, a cathode and a control electrode, for transmitting current from an alternating current source to a direct current load during alternate half cycles of the alternating current source, respectively, a current path comprising in series a first and a second resistance means, one of said resistance means having the characteristic that its resistance increases in response to a change in a certain direction of the root-mean-square value of current flowing therethrough, the second of said resistance means having a resistance-current characteristic which differs from that of said first resistance means, means for supplying alternating current from said source to said current path, a third space current device having an anode, a cathode and a control electrode, a resistor, means for supplying current from said source through said resistor to the space current path of said third space current device, means for impressing upon the control electrode-cathode circuit of said third device a voltage having as components in phase opposition the voltage across one of said resistance means and a voltage derived from said source, means for combining the pulsating voltage across said resistor with a voltage derived from said source and for impressing the resultant voltage upon the control grid-cathode circuit of said first space current device, a condenser, an asymmetrically conducting element, means for impressing said resultant voltage upon a circuit comprising said condenser and said asymmetrically conducting element in series for charging said condenser, a discharge circuit for said condenser, and a current path comprising said condenser connecting the control electrode and cathode of said second space current device.

4. A combination in accordance with claim 3 in which the time constant of said condenser charging circuit is substantially equal to or less than the period of a half cycle of current from said alternating current source.

5. A combination in accordance with claim 3 in which the time constant of said condenser discharge circuit is large with respect to the period of a half cycle of current from said alternating current source.

6. In combination, a full wave rectifier for rectifying current from an alternating current source and for supplying the rectified current to a direct current load, said rectifier comprising a first and a second space current device, each having an anode, a cathode and a control electrode, for transmitting current to said load during alternate half cycle periods of said current source, respectively, a current path comprising a first and a second resistance means, one of said resistance means having the characteristic that its resistance increases in response to a change in a certain direction of the root-mean-square value of current flowing therethrough, the second of said resistance means having a resistance-current characteristic which differs from that of said first resistance means, means for supplying alternating current from said source to said current path, a third space current device having an anode, a cathode and a control electrode, a resistor, means for supplying current from said source through said resistor to the space current path of said third space current device, means for impressing upon the control electrode-cathode circuit of said third space current device a voltage having as a component the voltage across one of said resistance means, means for setting up and impressing upon the control electrode-cathode circuit of said first space current device a control voltage comprising the voltage across said resistor, a condenser, means for charging said condenser to a voltage substantially equal to the average value of said control voltage, and means for impressing the voltage to which said condenser is charged upon the control grid-cathode circuit of said second space current device.

7. A combination in accordance with claim 6 in which said one of said resistance means comprises a thermistor.

8. In combination, a full wave rectifier comprising a first and a second space current device for transmitting current from an alternating current source to a direct current load during alternate half cycle periods of said alternating current source respectively, each of said devices having an anode, a cathode and a control electrode, means for deriving from said alternating current source a first unidirectional pulsating voltage the amplitude of which decreases in response to an increase of voltage of said source and vice versa, said pulses being substantially coincident with half cycle periods of one polarity of said current source, means for deriving from said alternating current source a second unidirectional pulsating voltage the amplitude of which increases in response to an increase of voltage of said source and vice versa, said pulses being substantially coincident with half cycles of opposite polarity of said current source, means for deriving an alternating voltage from said current source and means for impressing upon the control electrodes with respect to the cathodes of said devices a control voltage having as components said first and second pulsating voltages and said derived alternating voltage.

9. A combination in accordance with claim 8 in which said first and second pulsating voltage components of said control voltage are of opposite polarity.

10. A combination in accordance with claim 8 in which means are provided for deriving from said alternating current source a third unidirectional pulsating voltage the successive pulses of which are substantially coincident with successive half cycles, respectively, of current from said alternating current source and in which said control voltage includes as a component said third pulsating voltage.

11. In combination, a full wave rectifier comprising a first and a second space current device for rectifying current from an alternating current source and for supplying the rectified current to a direct current load, each of said space current devices comprising an anode, a cathode and a control electrode, a third and a fourth space current device each having an anode, a cathode and a control electrode, a first and a second resistor, means for supplying current from said alternating current source through said third space current device and said first resistor in series during half cycle periods of one polarity of said alternating current source, means for supplying current from said alternating current source through said fourth space current device and said second resistor in series during half cycle periods of opposite polarity of said alternating current source, means for impressing upon the control electrodes with respect to the cathodes of said first and second devices a voltage having as components the voltages across said first and second resistors, and means for controlling the control electrode-cathode voltages of said third and fourth devices in response to voltage changes of said alternating current source.

12. A combination in accordance with claim 11 in which there are provided means for deriving an alternating voltage from said alternating current source and means for impressing upon the control electrodes with respect to the cathodes of said first and second devices a voltage having as components the voltages across said first and second resistors and said derived alternating voltage.

13. A combination in accordance with claim 11 in which there are provided means for deriving from said alternating current source an unsymmetrical alternating voltage and means for impressing upon the control electrodes with respect to the cathodes of said first and second devices a voltage having as components the voltages across said first and second resistors and said derived alternating voltage.

14. An alternating voltage regulator for minimizing voltage changes across a load to which alternating current is supplied from an alternating current source, comprising a saturable reactor having a first winding through which current from said source is supplied to said load and a second winding, a transformer having a primary winding connected across said load and a plurality of secondary windings, a full wave rectifier comprising a first secondary winding of said transformer and a first and a second space current device for supplying rectified current to said second winding of said reactor to control the impedance of said first winding of said reactor, a current path comprising in series a first and a second resistance means, one of said resistance means having a resistance-current characteristic such that its resistance increases in response to a change in a certain direction of the root-mean-square value of current flowing in said current path, the other of said resistance means having a resistance-current characteristic which differs from that of said one of said resistance means, means for connecting said current path to a second secondary winding of said transformer to cause alternating current to be supplied thereto, a third space discharge device having an anode, a cathode and a control electrode, a first resistor, means for connecting said first resistor and the anode-cathode path of said third space current device in series to said second secondary winding of said transformer to cause a pulsating current to be supplied thereto, a circuit connecting the control electrode and cathode of said third space current device comprising in series one of said resistance means and a third secondary winding of said transformer, the voltage across said one of said resistance means and the voltage across said third secondary winding being in phase opposition in said control electrode-cathode circuit of said third space current device, a circuit connecting the control electrode and cathode of said first space current device comprising in series said first resistor and a portion at least of said second secondary winding, a circuit connecting the control electrode and cathode of said second space current device comprising a condenser, a second resistor, an asymmetrically conducting element, a circuit for charging said condenser comprising in series said second resistor, said asymmetrically conducting element, said portion of said secondary winding and said first resistor, all in series, a third resistor, and a discharge circuit for said condenser comprising said first, second and third resistors, all in series.

15. An alternating voltage regulator for minimizing voltage changes across a load to which alternating current is supplied from an alternating current source comprising a saturable reactor having a first winding through which current from said source is supplied to said load and a second winding, a transformer having a primary winding connected across said load and a plurality of secondary windings, a full wave rectifier comprising a first secondary winding of said transformer and a first and a second space current device for supplying to said second winding of said reactor rectified current for controlling the impedance of said first winding of said reactor, each of said space current devices having an anode, a cathode and a control electrode, a current path comprising in series a first and a second resistance means, one of said resistance means having a resistance-current characteristic such that its resistance increases in response to a change in a certain direction of the root-mean-square value of the current flowing in said current path, the other of said resistance means having a resistance-current characteristic which differs from that of said one of said resistance means, means for connecting said current path to a second secondary winding of said transformer to cause alternating current to be supplied thereto, a third and a fourth space current device each having an anode, a cathode and a control electrode, a first and a second resistor, means for connecting the space current path of said third space current device and said first resistor in series across a third secondary winding of said transformer, means for connecting the space current path of said fourth space current device and said second resistor in series across a fourth of said secondary transformer windings, a third resistor, an asymmetrically conducting element, means for connecting said third resistor and said asymmetrically conducting element in series across a portion of said third secondary winding, a first terminal of each of said first and second resistors being conductively connected to the cathode of each of said third and fourth space current devices, means for connecting a second terminal of said second resistor to the control electrode of each of said first and second space discharge devices, means for connecting a common terminal of said third resistor and said asymmetrically conducting element to the cathode of each of said first and second space discharge devices, means for connecting the control electrode and cathode of said third space current device comprising in series one of said resistance means and a portion at least of a fifth secondary winding of said transformer, and means for connecting the control electrode and cathode of said fourth space current device comprising in series said one of said resistance means and a portion at least of said fifth transformer winding.

16. An alternating voltage regulator for minimizing voltage changes across a load to which alternating current is supplied from an alternating current source comprising a saturable reactor having a first winding through which current from said source is supplied to said load and a second winding, a transformer having a primary winding connected across said load and a plurality of secondary windings, a full wave rectifier comprising a first secondary winding of said transformer and a first and a second space current device for supplying to said second winding of said reactor rectified current for controlling the impedance of said first winding of said reactor, said space current devices each having an anode, a cathode and a control electrode, a current path comprising in series a first and a second resistance means, one of said resistance means having a resistance-current characteristic such that its resistance increases in response to a change in a certain direction of the root-mean-square value of the current flowing in said current path, the other of said resistance means having a resistance-current characteristic which differs from that of said one of said resistance means, means for connecting said current path to a second secondary winding of said transformer to cause alternating current to be supplied thereto, a third and a fourth space current device each having an anode, a cathode and a control electrode, a first and a second resistor, means for connecting the space current path of said third space current device and said first resistor in series across a third secondary winding of said transformer, means for connecting the space current path of said fourth space current device and said second resistor in series across a fourth of said secondary transformer windings, a common terminal of each of said first and second resistors being connected to the cathodes of said third and fourth space current devices, means for connecting the control electrode and cathode of said third space current device comprising in series one of said resistance means and a portion at least of a fifth secondary winding of said transformer, means for connecting the control electrode and cathode of said fourth space current device comprising in series said one of said resistance means and a portion at least of said fifth transformer winding, a fifth and a sixth space current device each having an anode, a cathode and a control electrode, means for connecting the cathodes of said fifth and sixth space current devices to a terminal of said first resistor other than said common terminal, means for connecting the control electrodes of each of said fifth and sixth space current devices to said fourth secondary transformer winding, a sixth secondary transformer winding, a third resistor, means for connecting the cathodes of said fifth and sixth space current devices through said third resistor to a mid-tap of said sixth secondary winding, means for connecting the anodes of said fifth and sixth space current devices to the end terminals, respectively, of said secondary winding, an asymmetrically conducting element, a fourth resistor, a current path comprising said asymmetrically conducting element and said fourth resistor in series, means for connecting the terminals of said current path respectively to terminals of said sixth secondary winding which are electrically substantially equally spaced from said mid-tap of said winding, means for connecting the common terminal of said asymmetrically conducting element and said fourth resistor to the cathodes of said first and second space current devices, and means for connecting the cathodes of said fifth and sixth space current devices to the control electrodes of said first and second space current devices.

17. In combination two space current devices each having an anode, a cathode and a control electrode, means for deriving from an alternating current source and impressing upon the anode with respect to the cathode of said devices, respectively, alternating voltages of opposite phase, means for deriving from said alternating current source and impressing upon the control electrode with respect to the cathode of said devices, respectively, alternating voltages each having two opposed components, said component voltages having different rates of change respectively, with respect to the voltage of said source, thereby causing the space current flowing in one of said devices during half cycle periods of one polarity of said alternating current source and the space current flowing in the other of said devices during half cycle periods of opposite polarity of said alternating current source to change in opposite directions, respectively, in response to a change in a certain direction of the voltage of said source.

18. In combination, a space current device having an anode, a cathode and a control electrode, a transformer having a primary and a secondary, means for supplying current from an alternating current source to said primary, a circuit connecting the anode and cathode of said device comprising said secondary and a first resistor in series, a first terminal of said resistor being connected to a terminal of said secondary, an asymmetrically conducting element, a second resistor, a current path comprising said asymmetrically conducting element and said second resistor in series, means for connecting said current path across a portion of said secondary, means for impressing upon a circuit connecting the control electrode and cathode of said device an alternating voltage derived from said source, and means for utilizing the difference of the potential of the second terminal of said first resistor and the potential of the common terminal of said second resistor and said asymmetrically conducting element.

19. In combination, two space current devices each having an anode, a cathode and a control electrode, a transformer having a primary winding and a plurality of secondary windings, a first, a second and a third resistor, means for impressing upon the anode with respect to the cathode of said devices, respectively, alternating voltages of opposite phase, said means comprising a circuit connecting the anode and cathode of a first of said devices including in series a first of said secondary windings and said first resistor and a circuit connecting the anode and cathode of the second of said devices including in series a second of said transformer windings and said second resistor, a first terminal of said first resistor and a first terminal of said second resistor being connected to the cathodes of said devices, an asymmetrically conducting element, a current path comprising said asymmetrically conducting element and said third resistor in series connected across a portion of said first secondary winding, means for impressing upon the control electrode with respect to the cathode of each of said devices an alternating voltage derived from said source, and means for utilizing the difference of the potential of the second terminal of said second resistor and the potential of the common terminal of said third resistor and said asymmetrically conducting element.

WILLIAM HERBERT BIXBY.

REFERENCES CITED

The following references are of record in the file of this patent:

UNITED STATES PATENTS

| Number | Name | Date |
|---|---|---|
| 2,435,572 | Bixby | Feb. 10, 1948 |

FOREIGN PATENTS

| Number | Country | Date |
|---|---|---|
| 634,490 | Germany | Aug. 28, 1936 |